Nov. 14, 1967  V. F. CARTWRIGHT  3,353,179
DISTANCE INDICATING RADIO APPARATUS
Filed Feb. 16, 1966  2 Sheets-Sheet 1
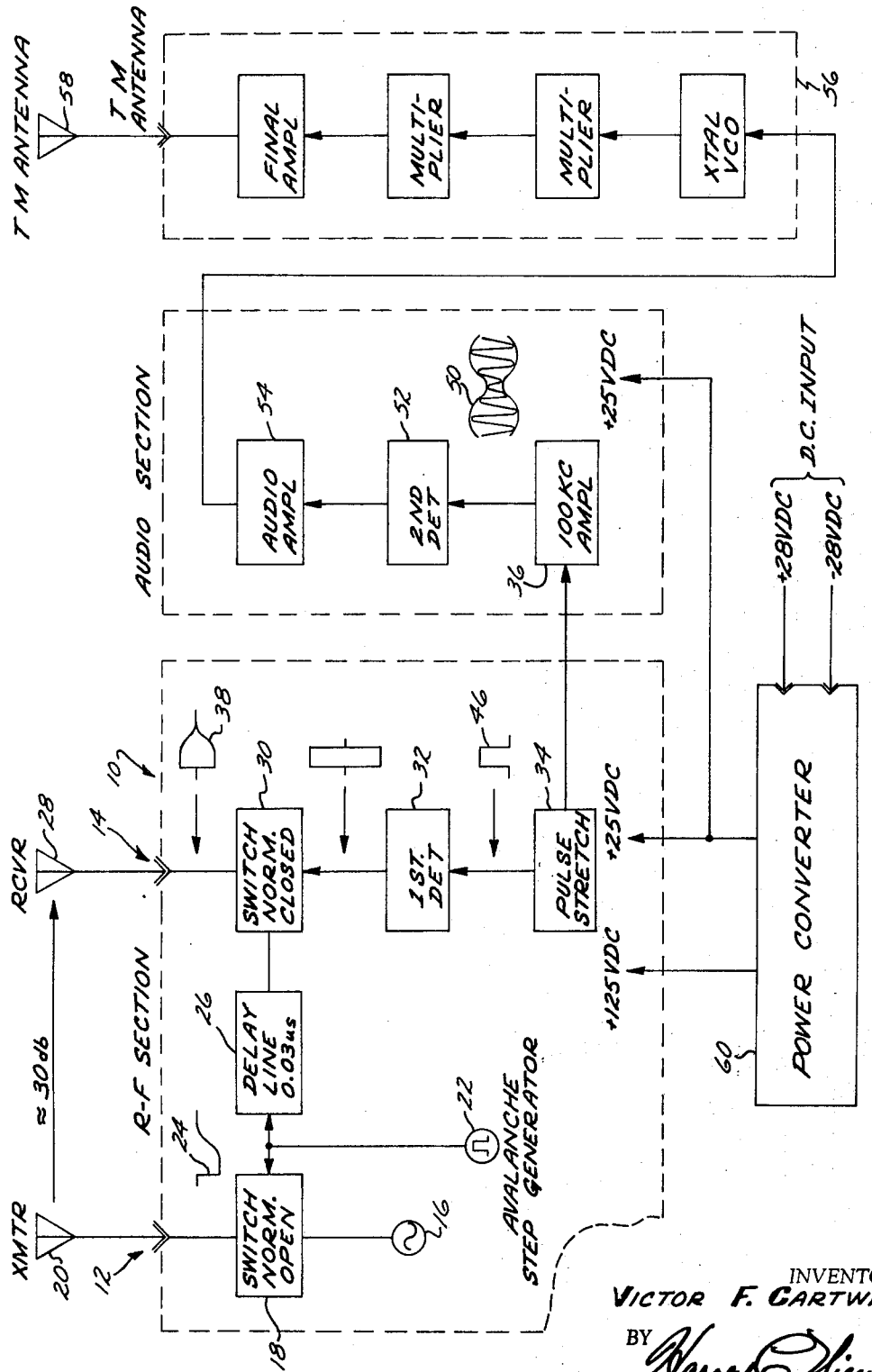
FIG. I
INVENTOR.
VICTOR F. CARTWRIGHT
BY
ATTORNEY

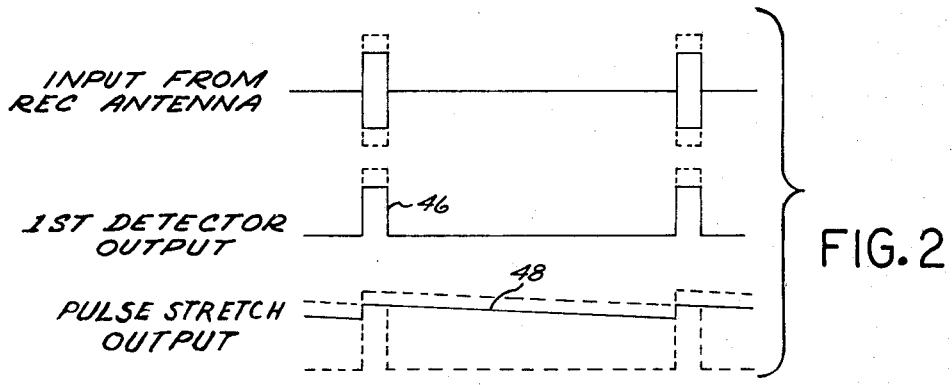
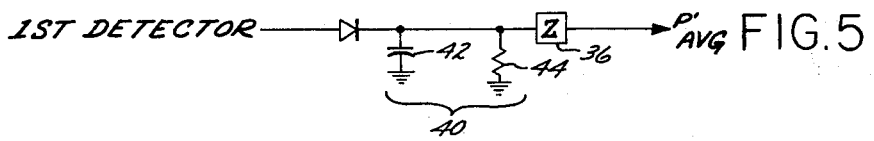
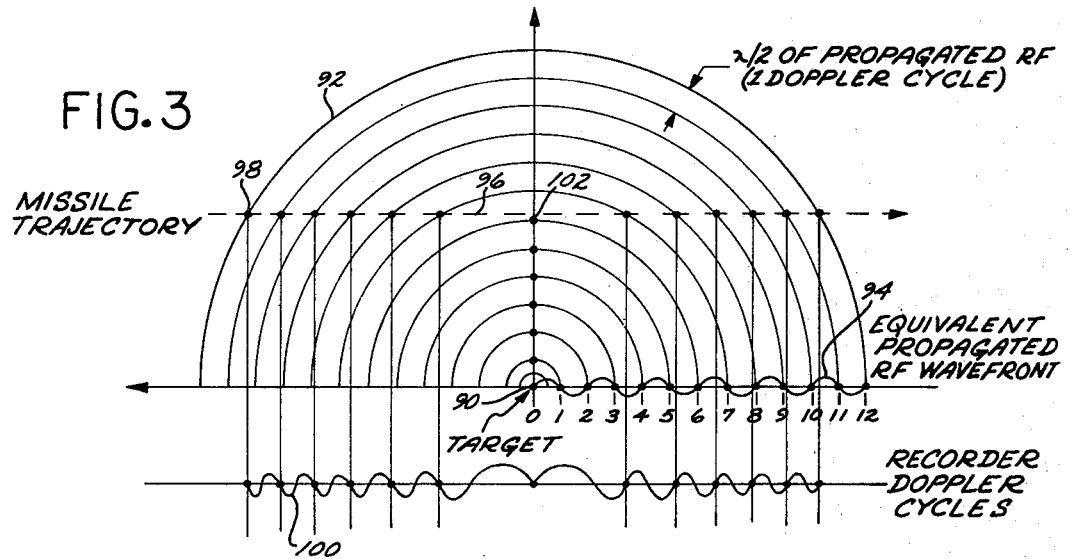
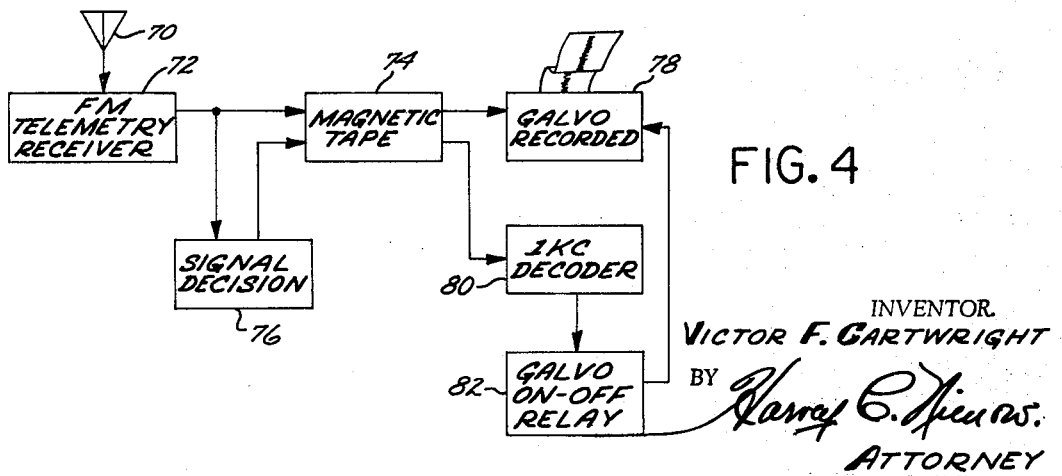

United States Patent Office 3,353,179
Patented Nov. 14, 1967

3,353,179
DISTANCE INDICATING RADIO APPARATUS
Victor F. Cartwright, Fullerton, Calif., assignor to Babcock Electronics Corporation, Costa Mesa, Calif., a corporation of California
Filed Feb. 16, 1966, Ser. No. 527,834
8 Claims. (Cl. 343—13)

ABSTRACT OF THE DISCLOSURE

The specification describes a system utilizing reflected radio frequency energy and Doppler phenomenon for measuring and indicating distances.

Transmission from a radio transmitting station is initiated periodically and a predetermined short time following each initiation a radio apparatus operative to receive signals from the transmitter after reflection from an object within a given range from the transmitter and receiver along with unreflected signals from the transmitter is rendered inoperative. The combined received signal is conditioned and its Doppler characteristic is telemetered to one indicating station for interpretation.

---

This invention relates generally to indicating apparatus and, more particularly, to means for indicating the minimum distance between two relatively moving objects.

In order to improve and refine weapons systems, it is necessary to determine the accuracy and effectiveness of the system to be improved or refined. For instance, in the field of missile weaponry, such as the development and perfecting of anti-missile missiles, it is desirable, if not mandatory, to determine how close the anti-missile comes to the missile to be destroyed. In such a case, it is necessary to determine the proximity of the anti-missile to the missile as they are propelled through space relative to each other. Only in the event that such information can be determined is it possible for scientists and engineers to devise further improvements and refinements in the weapons systems in order to improve its accuracy and effectiveness.

As will be apparent, it is not necessary that the projectile or moving object actually hit the target, but rather, sufficient destruction to the target can be assumed if the projectile or object is in close proximity to the target. Thus, it is necessary for the object to approach the target within a predetermined distance thereof to be effective in destroying the target.

In providing apparatus for indicating the proximity of a moving object and a target, it is desirable to have the nonexpendable, expensive apparatus located on the ground or within the target which can be retrieved at will, for obvious reasons of being able to recover such equipment. Thus, any such indicating apparatus should be fully operational without the need for storing much equipment aboard the projectile or moving object which will, in most cases, travel at a high rate of speed and will be nonrecoverable. Such a system is usually referred to as a "passive" system since the moving object does not have any equipment on board.

The present invention has as one of its objects the provision of indicating apparatus which will indicate when an object is within a predetermined maximum distance of the target.

Another object of the present invention is to provide such an indicating system which is capable of providing an indication as to the minimum distance obtained between the object and the target.

Another object of the present invention is to provide indicating apparatus as characterized above wherein a minimum amount of equipment is carried by the target, and substantially all signals can be transmitted to appropriate ground equipment for further processing.

An even further object of the present invention is to provide indicating apparatus as characterized above which employs time delay means which provides a fixed time interval during which the transmitter and receiver are simultaneously operational.

A further object of the present invention is to provide indicating apparatus as characterized above which employs solid state high speed switches for insuring substantially instantaneous initiation and termination of certain functions.

A still further object of the present invention is to provide indicating apparatus as characterized above which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a block diagram of apparatus according to the present invention;

FIGURE 2 depicts wave forms characterizing operation of the pulse stretch aparatus;

FIGURE 3 is a pictorial representation of an object passing within a predetermined distance of a target, showing resulting wave forms; and FIGURE 4 is a block diagram of ground equipment for analyzing information to provide the distance indication; and FIGURE 5 is a circuit diagram of the pulse stretch apparatus.

Like reference characters indicate corresponding parts throughout the several views of the drawings.

It is realized within the scope of the present invention, that the subject apparatus may be employed in conjunction with a projectile such as a missile, or with substantially any other type of object which is moving relative to a target. Accordingly, the word "object" is used herein and in the claims to denote a projectile of substantially any design, including airplanes, missiles, rockets and the like.

Referring to FIGURE 1 of the drawings, there is shown therein a schematic arrangement of the subject apparatus for indicating the presence of an object within a predetermined distance of a target. As indicated, the numeral 10 identifies the RF section of the apparatus which can be housed within a single enclosure and carried aboard the target.

Generally, the RF section comprises a transmitter portion 12 and a receiver portion 14. The transmitter portion is step-keyed and comprises a CW oscillator 16 which provides a CW signal at 1745 mc. The output of such oscillator is fed to a normally open high-speed, solid-state switch 18, and the output of such switch is fed to an omnidirectional transmitter antenna 20. Oscillator 16 is operable to provide the aforementioned 1745 mc. signal, but such signal will be permitted to radiate from antenna 20 only when switch 18 is closed.

The means employed for controlling switch 18 is a step generator 22. The output of such generator is fed to switch 18 as well as to time delay means such as delay line 26. This generator provides a negative step voltage as shown at 24, which when applied to switch 18 closes it to connect the oscillator 16 to antenna 20. In this manner, the transmitter portion 12 of the RF section 10 is caused to provide an abrupt UHF signal at antenna 20. It has been found that this arrangement provides a signal which rises in .003 microsecond, has a duration of .15 microsecond and decays in .2 to .3 microsecond.

The positive alternative to this is to "pulse" an oscillator or other signal source in a rather conventional manner. In so doing, however, it is found that the extremely rapid rise time cannot be readily achieved. It will be noted later that the receiver provides the same order of extremely rapid decay time at a fixed time after the transmitter is fired. Thus a rapidly decaying transmitter pulse is not required. This effects a reduction of transmitted spectral power density and hence less interference to other nearby equipment.

The receiver portion 14 of section 10 is provided to receive the reflected signal as the aforementioned UHF signal reaches an object within a predetermined distance of the target. Such receiver portion comprises an antenna 28, a normally closed high-speed, solid state switch 30, a first detector 32 and a pulse stretch circuit 34.

The direct spillover from transmitter antenna 20 to receiver antenna 28 results in an ambient signal in the first detector 32 whenever the normally closed switch 30 is in its closed position. If a reflecting object is within the predetermined distance of the target (which distance will hereinafter be defined in greater detail), the antenna 28 will also receive the aforementioned signal as emitted from antenna 20 and reflected from such object. The phase difference between the direct and reflected signals creates a new value which varies at a Doppler rate. This takes place, of course, only when switch 30 is in its closed position.

The delay means 26 is employed to control the state or condition of switch 30. As shown in FIGURE 1, such delay means is responsive to generator 22 to open switch 30 a predetermined time following closure of switch 18. That is, both switch 18 and delay means 26 are responsive to the output of step generator 22 such that the transmitter portion 12 is caused to substantially instantaneously commence emission of a signal and at the same time the delay means 26 is placed in operation. Approximately .03 microsecond thereafter, a signal is fed from delay means 26 to switch 30 so as to cause the latter to be substantially instantaneously moved to its open position.

The effect of the above-explained arrangement is that the receiver portion 14 is operable to receive the reflected signal from the object, but only for approximately .03 microsecond after the signal transmission has been initiated. Thus, if a reflecting object is within the predetermined distance of the target, the transmitted signal will reflect from such object and will be received by the first detector 32 of the receiver portion 14. If such object is a greater distance than said predetermined distance, the switch 30 will be open by the time the reflected signal is received thus preventing such reflection from reaching the first detector 32.

As a result of the foregoing, it will be apparent that the .03 microsecond delay afforded by delay means 26 defines the predetermined distance within which the reflecting object must be of the target to be identified by the subject apparatus. That is, .03 microsecond is the maximum time permitted for the signal to go from transmitter antenna 20 to the object and return to the receiver antenna 28.

It has been found that such predetermined distance may be from ten to fifty feet in accordance with the time delay afforded by means 26.

A reflecting object in motion relative to the target and within the aforementioned predetermined distance thereof, creates a pulse amplitude modulated condition (PAM) at the output of the first detector 32 having a frequency equal to the rate of change of the RF phase between the direct and reflected signals or Doppler rate. The magnitude of PAM at the first detector output is equal to the reflected signal, and possibly as low as 95 dbm. To avoid noise problems generated in low level audio amplifiers, the signal out of the first detector is amplified in a linear 100 kc. narrow band amplifier 36. After pulse stretching in circuitry 34, the gain of amplifier 36 is sufficient to overcome noise problems and the band width is adjusted to pass the double side band amplitude modulation, corresponding to a Doppler frequency.

The two signals actually received by antenna 28 are replica of the transmitted signal except that the spillover between antenna is attenuated somewhat and delayed a very small amount. The object reflected signal is attenuated a very considerable amount and also delayed by a proportionally greater value.

The signal output at 1st detector 34 is a pulse having a rise time of approximately 0.003 microsecond (transmitter rise time) a duration of 0.03 microsecond (length of delay line) and a decay time of 0.003 microsecond (receiver turn off time). The spacing between such signals is 10 microseconds, the transmitter portion 12 being caused to operate periodically to provide this result. The pulse stretching circuit 34 is utilized to take advantage of the peak power of the received signal. As shown in FIGURE 2 of the drawings, the pulse stretching circuit 34 comprises a CR circuit 40 having a capacitor 42 and a resistor 44. The peak amplitude of the detected pulse 46 is retained by capacitor 42 for the time interval determined by the value of the components of the CR circuit 40. This allows a 100 kc. ripple component to pass to the 100 kc. amplifier 36. This value is adjusted by the CR circuit so that it is always larger than the received Doppler signal but much less than the direct spillover from the transmitter. This prevents saturation of the 100 kc. amplifier and also keeps the Doppler signal from modulating the 100 kc. ripple component by more than 100 percent.

The peak RF voltage is thus held by capacitor 42, and if the RC is long compared to the time interval between pulses and if the output is measured after the signal passes through amplifier 36, the ratio of peak to average signal is nearly unity as shown by curve 48. For this reason, the signal level can be based on the peak radiated power rather than average power.

Due to filtering, the output of the 100 kc. amplifier is a sine wave 50 of constant amplitude until a reflecting object passes within the predetermined distance of the target. Then the amplitude varies at the Doppler rate. The magnitude of this variation is approximately equal to the reflected signal amplitude times the amplifier gain.

The 100 kc. amplifier output is rectified to extract the Doppler signal, filtered to remove the 100 kc. components and amplified in a simple audio limiter-amplifier 54. From here the Doppler signal is applied to the crystal circuit of transmitter 56 to provide ±125 kc. Doppler deviation for transmission from antenna 58 to a standard FM telemetry receiver located on the ground and as shown schematically in FIGURE 4 of the drawings.

Also carried on the target is suitable power source such as converer 60 shown in FIGURE 1 of the drawings. Such source provides the necessary operating voltages for the RF and audio sections of the above-described apparatus.

The ground station equipment shown in FIGURE 4 comprises an FM receiver antenna 70 and a standard FM telemetry receiver 72. Receiver 72 demodulates the Doppler frequency as received from antenna 58 through receiver antenna 70. The signal is then fed to a magnetic tape recorder 74 and also closes a relay through a signal decision circuit 76.

Recorder 74 is a dual magnetic tape recorder, and the use of the signal decision circuit 76 causes one channel to be delayed with respect to the other. The Doppler frequency from receiver 72 is fed directly to one channel of the tape recorder 74, whereas the signal to the other channel goes through the signal decision circuit. The latter channel thus records a 4 kc. burst which is initiated in the signal decision circuit and signifies the presence of a Doppler signal out of the receiver 72.

To produce a record of the Doppler cycles, the magnetic tape is played back so as to feed the Doppler information to a galvanometer 78. The channel which received the 4 kc. burst from the signal decision circuit 76 now feeds 1 kc. burst to a decoder 80. This decoder actuates a relay 82 and .02 second later the Doppler signal from the direct recording channel of the recorder 74 is recorded on galvanometer 78. The delay between the "record" and "play back" on the tape recorder allows the galvanometer 78 to reach its recording speed and to thereby graphically reproduce the information stored in the tape recorder.

Tape recorder 74 must be stopped after a score, reversed, and slowed down 4 to 1 and then played back into the galvanometer 78. Such slow down on the play back is necessary to allow a readable signal to be recorded on a standard self-developing galvanometer recorder.

Thus, the galvanometer is caused to record the number of Doppler cycles generated by an object moving relative to the target, but within the aforementioned predetermined distance thereof. That such number of cycles is related to the minimum distance between the object and the target is demonstrated in FIGURE 3 of the drawings.

The target is shown at 90 therein and the outer convolution 92 represents the aforedescribed predetermined distance from the target. Such distance, of course, constitutes a sphere about the target since the UHF antenna 20 is omnidirectional. Such distance between the target 90 and point 92, as above explained, is established by virtue of the propagation rate of the UHF signal from antenna 20 and the time delay afforded by delay means 26. Curve 94 represents the UHF signal emitted from antenna 20 at target 90. As indicated, each half cycle of the UHF signal represents one Doppler cycle.

With an object traversing the path represented by dotted line 96, such object initially enters the sphere 92 at point 98. When it does, it encounters the propagated UHF signal and effects reflection thereof back to the receiver portion 14 of the RF section as above explained. The resulting Doppler signal is shown in FIGURE 3 at 100. It will be noted, the Doppler signal becomes lower in frequency as the object approaches the point where it is closest to the target 90. This, of course, results from the fact that the rate of change of distance between the target and object decreases during this time until point 102 is reached, where there is no change in the distance therebetween.

The distance traveled to generate 1 Doppler cycle is ½ wave length at a frequency of 1745 mc., or 3.4 inches (approximately). The radar distance for a time of 0.03 microsecond is 15 feet (180 inches) or 53 Doppler cycles. The plot in FIGURE 3 uses only 12 Doppler cycles for example to reduce complexity of the drawing. For this explanatory drawing, a pulse width of 0.0068 microsecond is implied.

By utilizing a time delay of .0068 microsecond, it is seen that 12 cycles of 1745 mc. signal can be sent from the target 90 and received at switch 30 from an object at point 98. This establishes the range at $$\frac{6.81 \times 12}{2}$$

or 40.86 inches.

By counting the number of Doppler cycles from the time that the object travels from point 98 to point 102, an indication is provided of the miss distance. That is, as shown in FIGURE 3, there are six Doppler cycles in the curve 100 generated from the object passing from point 98 to point 102. This means that the object has missed the target 90 by a distance of $$\frac{6 \times 6.81}{2}$$

or 20.43 inches. By summing the entire received Doppler cycle count with an electronic counter as above explained with reference to FIGURE 4, an automatic data reduction method is achieved.

It is thus seen that the present invention provides a system for quickly determining the miss distance between a target and an object moving relative thereto and within a predetermined distance thereof. By reason of the extremely rapid transmitted pulse rise time, extremely rapid pulse decay time (before detection) and very accurate control of pulse width, the overall accuracy of this system is an order of magnitude better than can be achieved using more conventional prior techniques. Furthermore, the inclusion of the unusual 100 kc. narrow band width amplifier results in a reduction of normal system noise, thus enhancing the signal-to-noise ratio in the output by a considerable amount. The combination results in great accuracy and high fidelity data.

Although I have shown and described certain specific embodiments of my invention, I am full aware that many modifications thereof are possible. My invention, therefore, is not to be restricted except insofar as is necessitated by the prior art and by the spirit of the appended claims.

I claim:

1. Apparatus for indicating an object within a predetermined distance of a target comprising in combination, omnidirectional antenna means for sending and receiving radio signals, a transmitter, a detector, signal initiation, means including a first switch connected between said antenna means and said transmitter to effect initiation of signal transmission from said antenna means, and means including time delay means and a second switch, connected between said antenna means and said detector responsive to operation of said signal initiation means for disconnecting said detector from said antenna means a predetermined time following such operation.

2. Apparatus for indicating an object within a predetermined distance of a target according to claim 1, wherein said first switch is a high speed solid state normally open switch, and said means including said first switch comprises a step generator in circuit with said high speed switch to substantially instantaneously connect said transmitter to said antenna.

3. Apparatus for indicating an object within a predetermined distance of a target according to claim 2, wherein said time delay means is responsive to said step generator to commence said time delay substantially simultaneously with connection of said transmitter to said antenna means.

4. Apparatus for indicating an object within a predetermined distance of a target according to claim 2, wherein said second switch is also a high speed solid state switch which is substantially instantaneously responsive to said time delay means to disconnect said detector from said antenna means.

5. Apparatus for indicating an object within a predetermined distance of a target according to claim 4, wherein said time delay means is operable to effect a time delay of .03 microsecond between initiation of said signal transmission and disconnection of said detector.

6. Apparatus for indicating an object within a predetermined distance of a target according to claim 1, wherein the transmitter signal is provided directly to said detector for comparison with the reflection of said signal from said object within said predetermined distance as received by said antenna means, and indicating means is provided for indicating the number of cycles in the low frequency signal resulting from said comparison with the number of cycles transmitted by said transmitter between initiation of signal transmission and disconnection of said detector as an indication of the minimum distance between said object and said target.

7. Apparatus for indicating an object within a predetermined distance of a target according to claim 6, wherein said time delay means is responsive to initiation of signal transmission from said antenna means to disconnect said detector from said antenna means .03 microsecond later, whereby said detector is operable to receive said transmitter signal directly and said reflected signal for only said .03 microsecond period of time.

8. Apparatus for indicating an object within a predetermined distance of a target according to claim 1, wherein a delay line is used as said time delay means for providing said predetermined time delay between initiation of signal transmission and disconnection of said detector and antenna means.

References Cited
UNITED STATES PATENTS 2,442,695   6/1948   Koch _____ 343—17.1 X
3,178,710   4/1965   Ammon _____ 343—12

RODNEY D. BENNETT, *Primary Examiner.*

T. H. TUBBESING, *Assistant Examiner.*